(12) United States Patent
Mattsson

(10) Patent No.: US 9,193,541 B2
(45) Date of Patent: Nov. 24, 2015

(54) METHOD AND AN APPARATUS FOR REDUCING THE HEAT LOSS IN A HEATED WORKPIECE

(75) Inventor: Per-Arne Mattsson, Blidsberg (SE)

(73) Assignee: AUTOMATION, PRESS AND TOOLING, A.P. & T AB, Tranemo (SE)

( * ) Notice: Subject to any disclaimer, the term of this patent is extended or adjusted under 35 U.S.C. 154(b) by 75 days.

(21) Appl. No.: 14/119,453

(22) PCT Filed: May 22, 2012

(86) PCT No.: PCT/SE2012/000080
§ 371 (c)(1),
(2), (4) Date: Feb. 20, 2014

(87) PCT Pub. No.: WO2012/161636
PCT Pub. Date: Nov. 29, 2012

(65) Prior Publication Data
US 2014/0199137 A1 Jul. 17, 2014

(30) Foreign Application Priority Data

May 24, 2011 (SE) ...................................... 1100415

(51) Int. Cl.
*F27D 3/00* (2006.01)
*B65G 49/00* (2006.01)
(Continued)

(52) U.S. Cl.
CPC *B65G 49/00* (2013.01); *C21D 1/34* (2013.01); *C21D 9/0068* (2013.01); *F27D 3/00* (2013.01); *F27D 3/0024* (2013.01); *F27D 15/00* (2013.01); *C21D 1/673* (2013.01)

(58) Field of Classification Search
CPC ......... F27D 15/00; F27D 3/00; F27D 3/0024; F27D 3/06; B21D 37/16
USPC ............... 414/214, 215; 432/247, 253, 254.1, 432/254.2, 245, 239; 266/262, 263
See application file for complete search history.

(56) References Cited

U.S. PATENT DOCUMENTS 2,020,184 A * 11/1935 Hodson et al. ................. 266/263
2,944,500 A * 7/1960 Raynes ....................... 72/342.92
(Continued)

FOREIGN PATENT DOCUMENTS

CN 85107934 A 7/1986
CN 1718767 A 1/2006
(Continued)

OTHER PUBLICATIONS

International Search Report (Sep. 3, 2012) for corresponding International application No. PCT/SE2012/000080.
(Continued)

*Primary Examiner* — Saul Rodriguez
*Assistant Examiner* — Mark Hageman
(74) *Attorney, Agent, or Firm* — WRB-IP LLP

(57) ABSTRACT

A method of reducing the heat loss of a workpiece when the workpiece is displaced from a furnace to a tool includes displacing the workpiece resting on a carrier to the tool. The displacement takes place with the workpiece and the carrier located internally in a box with a heat reflecting inner side. At the tool, the workpiece is exposed. An apparatus for carrying the method into effect has, according to the present invention, a box with a heat reflecting inner side and a linear conveyor for insertion and removal of the carrier and the workpiece into and out of the box, respectively.

6 Claims, 4 Drawing Sheets

(51) Int. Cl.
*C21D 9/00* (2006.01)
*C21D 1/34* (2006.01)
*F27D 15/00* (2006.01)
*C21D 1/673* (2006.01)

(56) References Cited

U.S. PATENT DOCUMENTS

| | | | |
|---|---|---|---|
| 4,192,646 A * | 3/1980 | Berg | 432/239 |
| 5,402,994 A | 4/1995 | Egger | |
| 2006/0043653 A1 | 3/2006 | Chretien | |
| 2010/0269559 A1 | 10/2010 | Ishiguro et al. | |

FOREIGN PATENT DOCUMENTS

| | | |
|---|---|---|
| CN | 10194246 A | 10/2008 |
| DE | 3520403 A1 | 1/1987 |
| EP | 0076577 A1 | 4/1983 |
| EP | 0330293 A2 | 8/1989 |
| JP | S58133316 A | 8/1983 |
| JP | S58144413 A | 8/1983 |
| JP | H06158152 A | 6/1994 |
| JP | 2001221576 A | 8/2001 |
| KR | 20100096832 A | 9/2010 |
| SU | 1538002 A1 | 1/1990 |

OTHER PUBLICATIONS

Chinese Search Report (Mar. 10, 2015) (translation) for corresponding Chinese App. 201280024824.1.
European Search Report (Nov. 12, 2014) for corresponding European App. 12790293.0.

\* cited by examiner

METHOD AND AN APPARATUS FOR REDUCING THE HEAT LOSS IN A HEATED WORKPIECE

BACKGROUND AND SUMMARY

The present invention relates to a method for reducing the heat loss in a heated workpiece, when the workpiece is moved from a furnace to a processing tool, the workpiece being removed from the furnace and displaced on a carrier device to the processing tool, in which it is inserted.

The present invention also relates to an apparatus for reducing the heat loss in a workpiece, when the workpiece is displaced by means of a carrier device from a furnace to a processing tool.

Press hardening is a technique which has become increasingly common, for example as regards the manufacture of car body parts in the automotive industry. Press hardening entails that a workpiece is placed in a furnace, where the workpiece is heated to the intended temperature, often of the order of magnitude of 900° C. or more. As regards car body parts, the workpiece is often a sheet metal piece of a thickness of the order of magnitude of between 0.6 and 2.0 min. When the workpiece has reached the intended temperature, it is removed from the furnace and placed in a press tool where pressing to the intended configuration is carried out. In that the tool is cooled and in that there is extremely good contact between the workpiece and the processing surfaces of the tool, a very rapid temperature reduction takes place of the workpiece so that this is hardened simultaneously with the forming operation.

On inserting the workpiece in the furnace, use is made of a carrier on which the workpiece rests. This carrier May either be permitted to remain in the furnace during the heating time, or alternatively be removed immediately after insertion of the workpiece. In the latter case, the carrier is placed in the furnace again after completed heating and lifts out the workpiece and transfers it to a processing tool.

In the above-mentioned technology, it is vital that the workpiece is at the intended temperature when it arrives in the processing tool. Heat losses during the displacement from the furnace to the processing tool may be considerable in that a workpiece produced from sheet metal has a large surface area in relation to the mass which is heated. At those temperature levels which are under consideration, a considerable proportion of the heat losses is caused by radiation. Nevertheless, the temperature loss may also be influenced by the ambient temperature, variations in the displacement time, draughts and similar factors. In order for the end result to be of the requisite standard, it is necessary that the temperature of the workpiece when it is placed in the processing tool can be kept at the correct level and within narrow tolerances. However, the vital point is that the workpiece does not cool more than from about 930° C. down to approx. 800° C.

It is desirable to design the method intimated by way of introduction such that the heat loss during displacement of the workpiece from the furnace to the processing tool is kept to a minimum and as far as possible without influence from the ambient surroundings.

Concerning the apparatus, an aspect of the present invention resolves corresponding or analogous problems and in addition and an aspect realizes an apparatus which is simple and economical in manufacture and economical in operation.

According to a method aspect of the present invention, a carrier device and workpiece are brought to a position substantially internally in an enclosure with a beat reflecting interior, that the enclosure and the carrier device with the workpiece are moved to the processing tool where the carder device is exposed and the workpiece is passed into the processing tool.

An apparatus aspect of the present invention includes an enclosure with a heat reflecting interior, the carrier device and the workpiece being moveable to and from a position substantially internally in the enclosure, and the enclosure together with the carrier device is moveable from the furnace to the processing tool.

BRIEF DESCRIPTION

The present invention will now be described in greater detail hereinbelow, with reference to the accompanying Drawings. In the accompanying Drawings.

DETAILED DESCRIPTION

Figure 1:
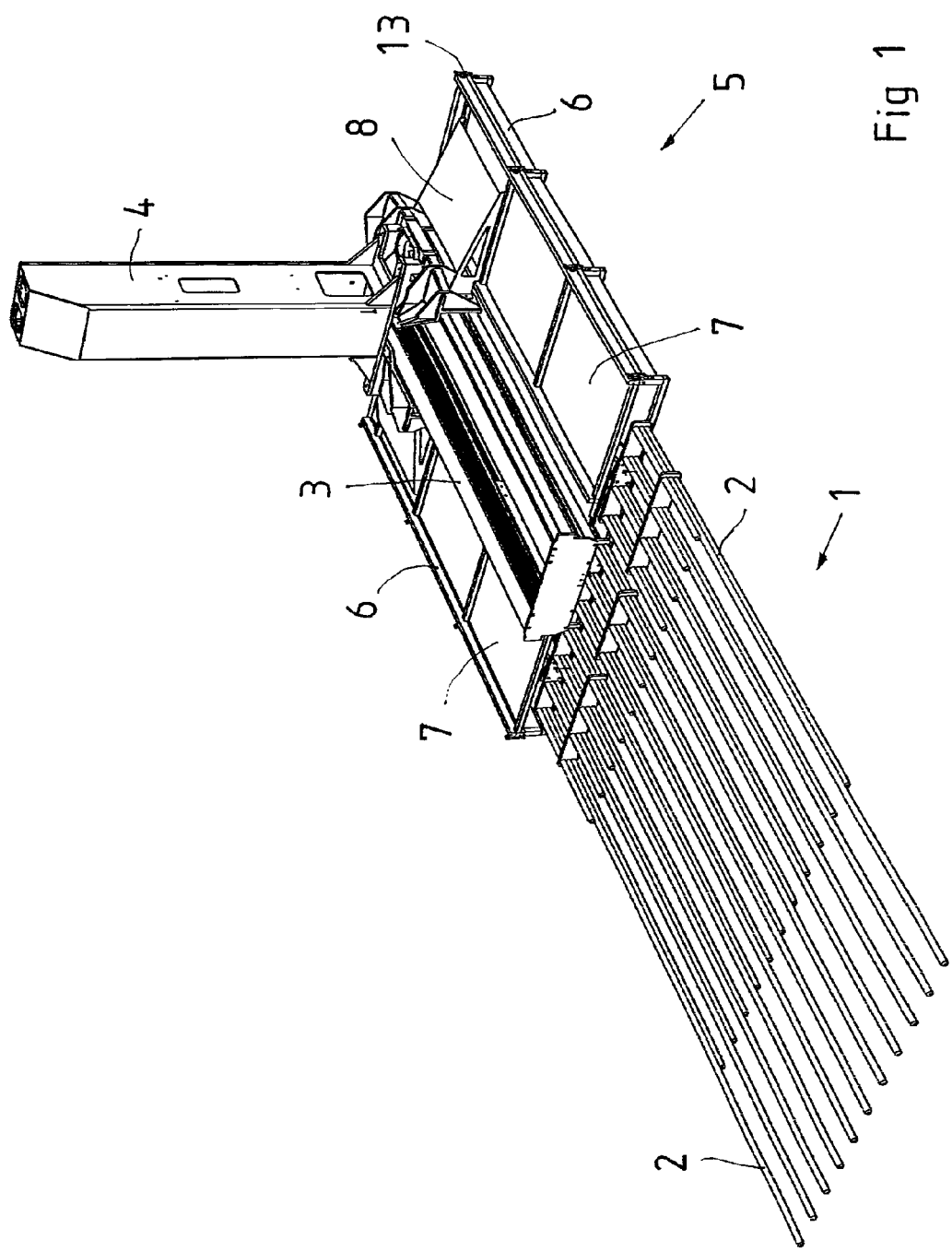
FIG. 1 is a perspective view of the subject matter of the present invention in a position where the carrier device is located outside the enclosure.

It will be apparent from FIG. 1 that the subject matter of the present invention consists of or comprises a carrier device 1 with a number of elongate, mutually spaced apart carrier members 2, which define a stacking surface for a workpiece (not shown on the Drawing). The carrier device 1 is moveable as a rigid unit under the action of a first prime mover 3, such as a linear feeder or an industrial robot, from the position illustrated in FIG. 1 to the position illustrated in FIG. 2. Further, the subject matter of the present invention includes a retainer 4 which is connected to a prime mover, a linear feeder or an industrial robot, for displacing the entire subject matter of the present invention. Finally, the subject matter of the present invention includes an enclosure 5, into which the cattier device 1 is insertable under the action of the first prime mover 3.

The subject matter of the present invention may also include a second prime mover of the same or other type than those described above, by means of which the enclosure 5 is displaceable in relation to the retainer 4.

When the subject matter of the present invention is reduced into practice, it is displaced into the immediate proximity of a furnace in which a workpiece is to be heated to suitable temperature, generally of the order of magnitude of 900° C. or more, typically approx. 930° C. The furnace is opened, whereafter the carrier device 1 is moved into the furnace for insertion of the workpiece therein. Thereafter, the carrier device is withdrawn either by retraction of the carrier device to the position illustrated in FIG. 2 or by displacement of the entire subject matter of the invention. Movements in the vertical direction may also come into consideration, in particular if the furnace has several storeys.

When the workpiece has reached the correct temperature, the carrier device is once again slid into the furnace for removal of the workpiece. In such instance, the workpiece is at a temperature of the order of magnitude of 900° C. or more and because of its slight material thickness it will rapidly cool, initially by thermal radiation and later, when the temperature has fallen, via convection.

Figure 2:
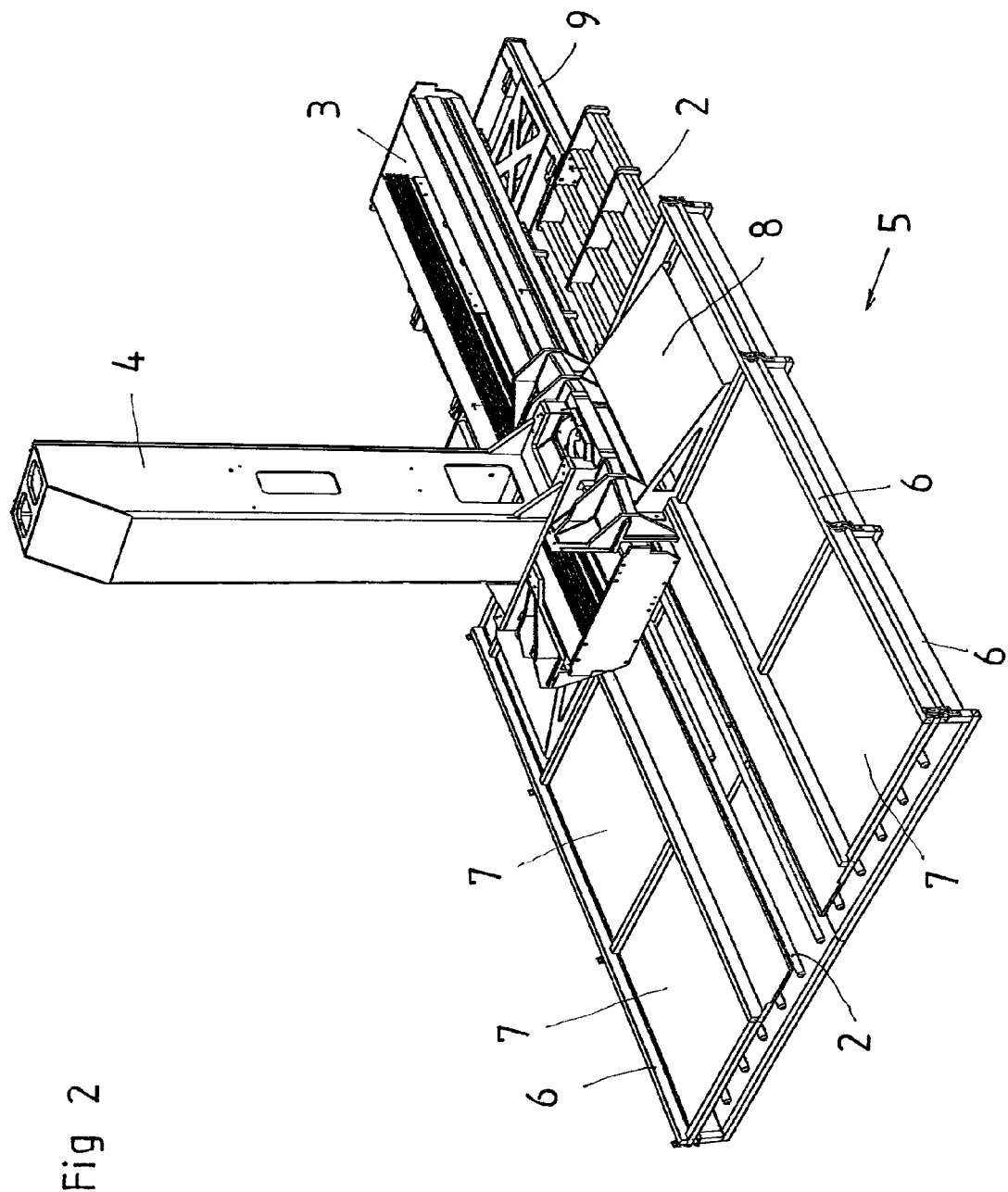
FIG. 2 shows the subject matter of the present invention in another position where the carrier device is located interiorly in the enclosure.

In order to reduce the action of the ambient surroundings on the workpiece, the carrier device 1 and the workpiece resting thereon are withdrawable into the enclosure 5 as is apparent from FIG. 2. The position internally, or at least substantially internally, in the enclosure 5 entails that the workpiece is screened off from the surroundings so that the ambient temperature, air draughts or similar factors cannot, or to but an insignificant degree, affect the workpiece.

According to the present invention, the enclosure 5 has its interior surfaces designed for high thermal reflection by being ground, polished or coated with a heat reflecting surface coating, for example chrome-plated. Naturally, the defining surfaces of the enclosure may also be made in their entirety from a heat reflecting material, for example stainless steel, polished or chrome-plated sheet metal.

Once the carrier device 1 has been brought to the position illustrated in FIG. 2, or substantially internally in the enclosure 5, the subject matter of the present invention, or at least the carrier device and the enclosure, is displaced to a position adjacent the processing tool where the carrier device 1 is exposed so that the workpiece may be applied in the processing tool. This may be put into effect either directly with the carrier device or by the intermediary of some additional displacement device.

Displacement of the carrier device 1 and the enclosure 5 between the furnace and the tool, and vice versa, may either be realised by the intermediary of an industrial robot connected to the retainer 4, a linear feeder or by a second prime mover, which as a rigid unit displaces the carrier device and the enclosure when the carrier device is located interiorly therein.

In a process of the type under consideration here, the intention is to achieve as high a work rate as possible, i.e. rapid accelerations, high average speeds and rapid retardations. For this reason, the moveable masses must be kept as low as possible.

According to the present invention, the enclosure 5 includes a framework 6 suitably consisting of or comprising square tubes. This framework 6 is coated with sheet metal panels 7 or panels of other refractory and heat resistant material.

Figure 4:
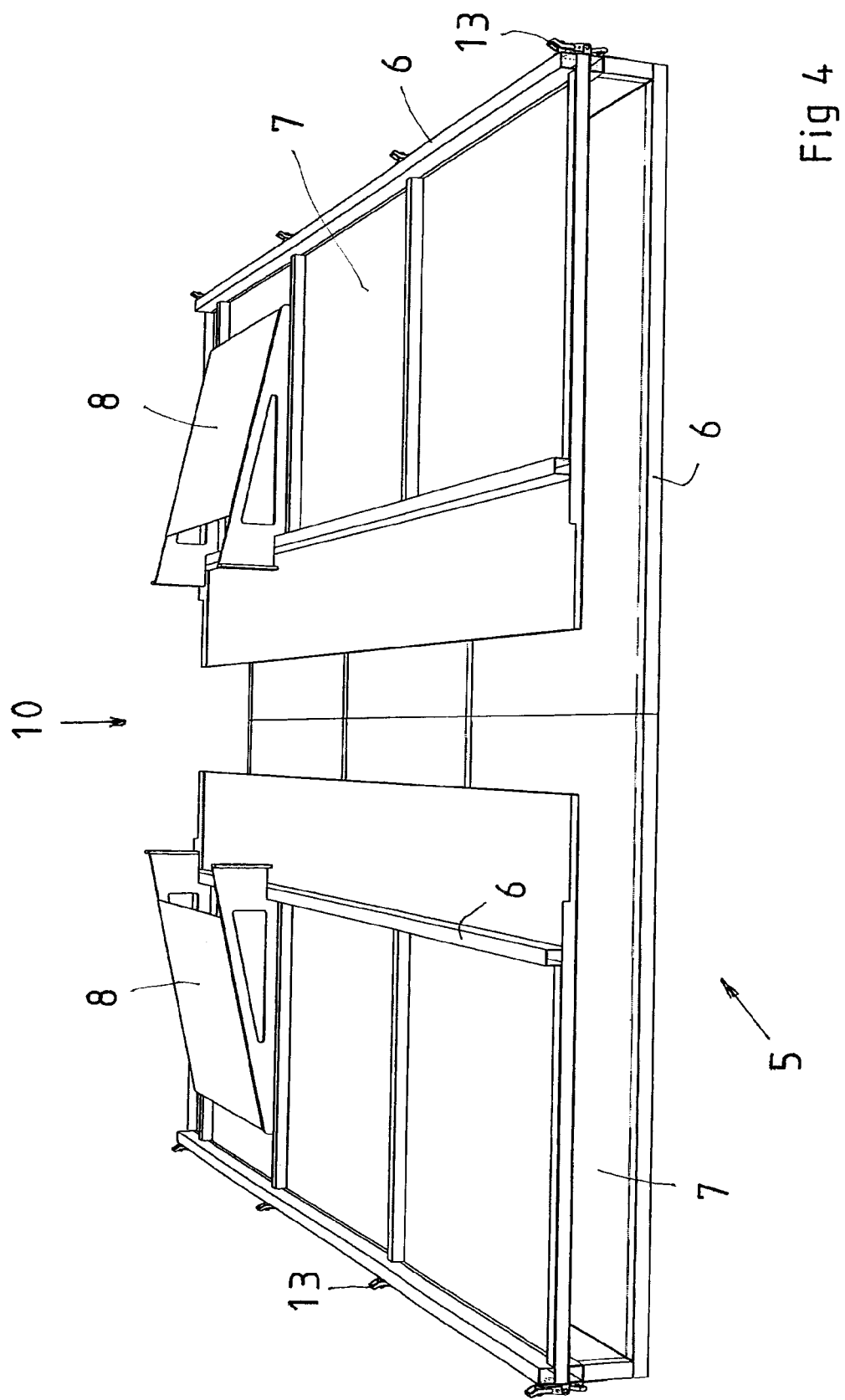
FIG. 4 is an end elevation of the enclosure according to FIG. 3.

The enclosure 5 further displays, in its distal end in FIG. 4, anchorages 8 by means of which it may be fixed in the retainer 4 or in a second prime mover (not shown on the Drawing) which connects the enclosure 5 to the retainer 4. Possibly, the first prime mover and the second prime mover may be designed as a common, possibly linear, prime mover where the first prime mover 2 has a greater movement range than the second prime mover.

It will be apparent from FIG. 2 that the carrier device 1 in its distal end in the figure has a connection by means of which it is connected to the first prime mover 3. Further, the enclosure 5 has, in its upper surface, an elongate opening 10 through which extend those components which connect the connection 9 to the first prime mover 3.

Figure 3:
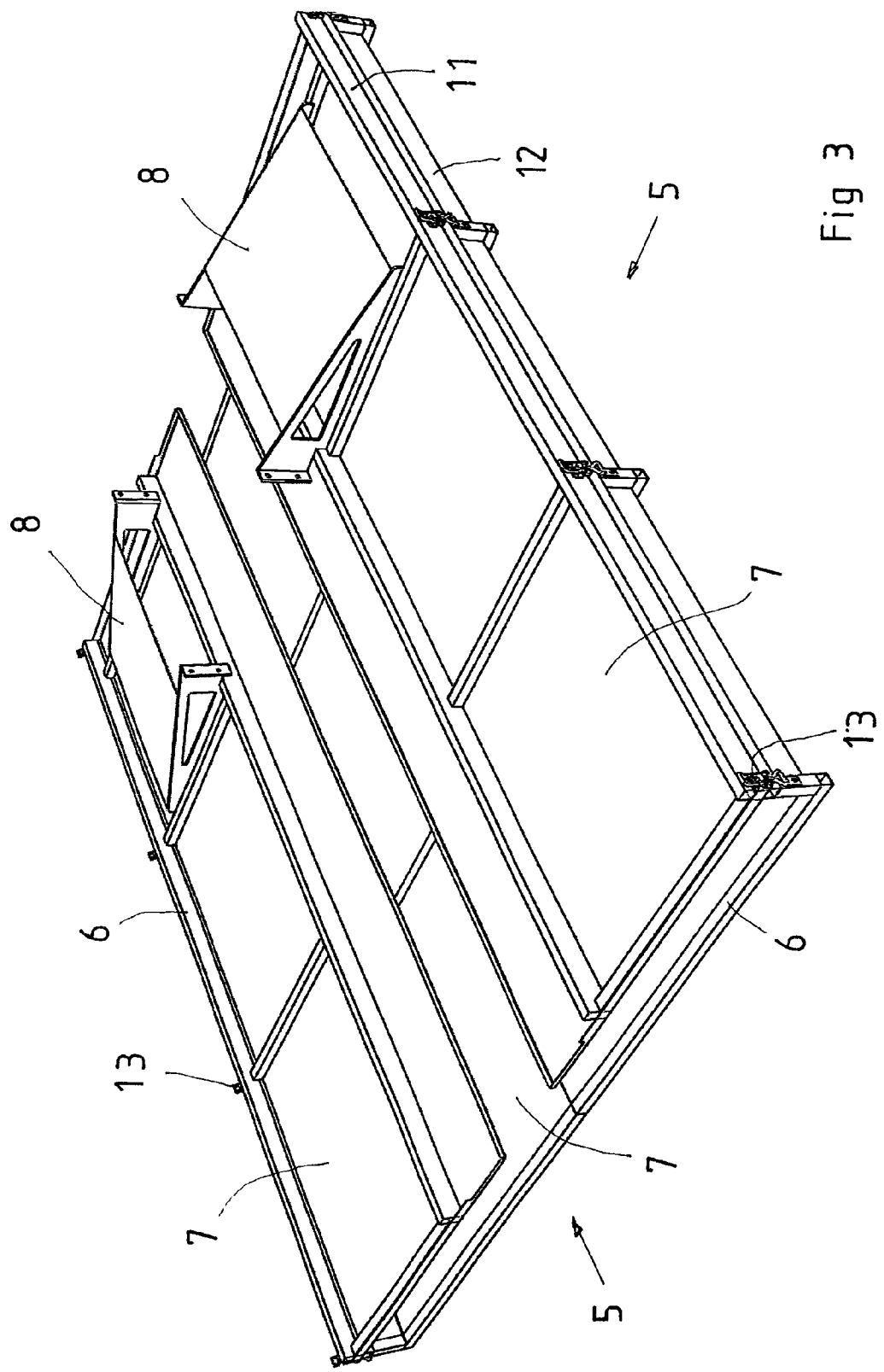
FIG. 3 is a perspective view of the enclosure included in the subject matter of the present invention.

It will be particularly apparent from FIGS. 3 and 4 that the enclosure 5 consists of or comprises an upper portion 11 and a lower portion 12 which are interconnected by means of a number of connections 13. Hereby, the lower portion 12 may be separated from the upper portion 11 and possibly be replaced by an otherwise dimensioned lower portion, which may prove necessary depending upon the appearance of the carrier device 1 and the workpiece which is to be processed. However, the most important reason for the enclosure 5 to be openable is that it may need to be cleaned internally in order to retain its pristine reflecting capacity. Correspondingly, the carrier device 1 is connected by the intermediary of quick coupling to the first prime mover 3.

The function of the subject matter of the present invention and in particular the enclosure 5 is based on the concept that heat which radiates out from a workpiece disposed interiorly in the enclosure will impinge upon the heat reflecting interior surfaces therein in order to be redirected back to the workpiece. Practical measurements have demonstrated that the temperature loss of a workpiece may be reduced by as much as 80-90° C. in a typical press hardening line or in a typical press hardening process.

Possibly, the action of the enclosure 5 may be further improved if the enclosure is provided with a thermal insulation, so long, as this is not heavy, since in such an event the mass would increase and the work rate reduce.

What is claimed is:

1. A method of reducing the heat loss in a heated sheet metal workpiece when the workpiece is displaced from a furnace to a processing tool, comprising:
   removing the workpiece from the furnace,
   displacing the workpiece to and inserting the workpiece in the processing tool via a carrier device by
      bringing the carrier device and the workpiece to a position substantially internally in an enclosure with a heat reflecting inner side, and
      moving the enclosure and the carrier device with the workpiece to the processing tool, where the carrier device is exposed and the workpiece is inserted in the processing tool,
   wherein the carrier device is displaced into and out of the furnace and into the interior of the enclosure by a first prime mover, and
   wherein the first prime mover moves along a longitudinal axis of an elongate opening in the upper side of the enclosure, the elongate opening having a length, width, and depth, and the longitudinal axis extending along the length of the elongate opening.

2. The method as claimed in claim 1, wherein the carrier device is moved into the furnace for withdrawing the workpiece.

3. The method as claimed in claim 1, wherein the carrier device and the enclosure are displaced together between the furnace and the processing tool, and vice versa, by means of at least one second prime mover.

4. An apparatus for reducing the heat loss of a heated sheet metal workpiece, comprising
   a carrier device configured to be moved into a furnace in which the workpiece has been heated and to displace the workpiece from the furnace to a processing tool,
   an enclosure with a heat reflecting inner side, the carrier device and the workpiece being insertable into and withdrawable from a position substantially internally in the enclosure, and the enclosure together with the carrier device and the workpiece being displaceable from the furnace to the processing tool, and vice versa,
   wherein the carrier device is connected to a first prime mover which is configured to displace the carrier device into and out of the furnace for inserting and withdrawing, respectively, the workpiece,
   wherein the first prime mover is also configured to displace the carrier device into and out of the enclosure, respectively, and
   wherein the first prime mover is configured to move along a longitudinal axis of an elongated opening in the upper side of the enclosure, the elongate opening having a length, width, and depth, and the longitudinal axis extending along the length of the elongate opening.

5. The apparatus as claimed in claim 4, wherein at least one second prime mover is configured so as together to displace the carrier device and the enclosure between the furnace and the processing tool, and vice versa.

6. The apparatus as claimed in claim 4, wherein the heat reflecting inner side of the enclosure is realised by grinding, polishing or coating with a heat reflecting surface layer.

\* \* \* \* \*